(12) United States Patent
Fromme et al.

(10) Patent No.: US 11,316,423 B2
(45) Date of Patent: Apr. 26, 2022

(54) HALF-BRIDGE HAVING POWER SEMICONDUCTORS

(71) Applicant: Siemens Aktiengesellschaft, Munich (DE)

(72) Inventors: Christopher Fromme, Fürth (DE); Marvin Tannhäuser, Hausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/975,484

(22) PCT Filed: Feb. 27, 2018

(86) PCT No.: PCT/EP2018/054788
§ 371 (c)(1),
(2) Date: Aug. 25, 2020

(87) PCT Pub. No.: WO2019/166072
PCT Pub. Date: Sep. 6, 2019

(65) Prior Publication Data
US 2021/0028690 A1    Jan. 28, 2021

(51) Int. Cl.
*H02M 1/38* (2007.01)
*H02M 1/00* (2006.01)

(52) U.S. Cl.
CPC .......... *H02M 1/38* (2013.01); *H02M 1/0012* (2021.05); *H02M 1/0058* (2021.05); *H02M 1/0093* (2021.05)

(58) Field of Classification Search
CPC .......... H02M 1/0012; H02M 1/0054; H02M 1/0058; H02M 1/14; H02M 1/15;
(Continued)

(56) References Cited

U.S. PATENT DOCUMENTS

| 4,727,308 A | 2/1988 | Huljak et al. ............. 323/222 |
| 5,093,771 A * | 3/1992 | Harvest ................... H02M 1/38 361/91.3 |

(Continued)

FOREIGN PATENT DOCUMENTS

| DE | 102009000602 A1 | 12/2009 | ............ H02M 3/158 |
| DE | 102015101673 A1 | 8/2015 | ............ H02M 3/158 |
| WO | 2009 158283 | 12/2019 | ............ H02M 3/156 |

OTHER PUBLICATIONS

Search Report for International Application No. PCT/EP2018/054788, 10 pages, dated Oct. 26, 2018.
(Continued)

*Primary Examiner* — Fred E Finch, III
(74) *Attorney, Agent, or Firm* — Slayden Grubert Beard PLLC

(57) ABSTRACT

Various embodiments include a half-bridge comprising: a first power semiconductor; a second power semiconductor connected in series with the first power conductor; a controller for the power semiconductors; a line starting at connection node of the power semiconductors; and a meter for measuring the current in the line. The controller is configured to: compare the current with an upper threshold value and a lower threshold value; switch off the first power semiconductor if the upper threshold value is reached; switch on the second power semiconductor after a first dead time has elapsed; and switch off the second power semiconductor if the lower threshold value is reached; and switch on the first power semiconductor after a second dead time has elapsed.

8 Claims, 5 Drawing Sheets

(58) Field of Classification Search
CPC ........ H02M 1/38; H02M 1/385; H02M 3/155; H02M 3/158; H02M 3/1588
See application file for complete search history.

(56) References Cited

U.S. PATENT DOCUMENTS

| | | | |
|---|---|---|---|
| 10,218,258 B1* | 2/2019 | Nagl | H02M 1/083 |
| 2007/0109822 A1 | 5/2007 | Kuan | 363/21.14 |
| 2009/0302814 A1 | 12/2009 | Kapels et al. | 323/282 |
| 2011/0018515 A1* | 1/2011 | McCloy-Stevens | H02M 3/1588 |
| | | | 323/284 |
| 2012/0327692 A1* | 12/2012 | Cantoro | H02M 3/3387 |
| | | | 363/21.03 |
| 2016/0105111 A1 | 4/2016 | Yang | H02M 3/158 |
| 2016/0276945 A1 | 9/2016 | Yan et al. | 363/21.14 |
| 2017/0040894 A1 | 2/2017 | Mevay et al. | 323/271 |
| 2017/0231042 A1* | 8/2017 | Willaert | H05B 45/375 |
| 2017/0285674 A1 | 10/2017 | Deboy | G05F 1/56 |
| 2017/0338735 A1* | 11/2017 | Alarcon-Cot | H05B 45/38 |
| 2018/0054118 A1* | 2/2018 | Lee | H02M 3/158 |
| 2021/0175883 A1* | 6/2021 | Degrenne | H03K 17/168 |

OTHER PUBLICATIONS

German Office Action, Application No. 112018007167.7, 5 pages, dated May 7, 2021.

\* cited by examiner

HALF-BRIDGE HAVING POWER SEMICONDUCTORS

CROSS-REFERENCE TO RELATED APPLICATIONS

This application is a U.S. National Stage Application of International Application No. PCT/EP2018/054788 filed Feb. 27, 2018, the contents of which are hereby incorporated by reference in their entirety.

TECHNICAL FIELD

The present disclosure relates to power semiconductors. Various embodiments include half-bridges having a first and second power semiconductor that are connected in series and a controller for the power semiconductors and/or methods for the operation thereof.

BACKGROUND

In power electronics circuits such as inverters or switched-mode power supplies, half-bridges are used as one of the most important basic circuits in almost every topology. Half-bridges comprise a first and second power semiconductor, for example MOSFETs, that are connected in series. The two outer terminals of the power semiconductors form a first and second terminal of the half-bridge and may for example be connected to a DC voltage. The connection node of the two power semiconductors forms a third terminal of the half-bridge and is connected to a load via a line. A power flow and a current in the line are able to be directed both toward the half-bridge and away therefrom.

Half-bridges often have inductive loads. The inductive load may in this case be a dedicated inductive component such as for example a choke or a parasitic inductance, for example the stray inductance of a transformer or the power inductor. The inductive load is often a mixture of both elements. In order to achieve desired current and/or voltage profiles, the power semiconductors of the half-bridge have to be switched on alternately at a high frequency and possibly with different switch-on times. Simultaneous switching on in this case has to be avoided so as not to generate any short circuit. This results in an approximately rectangular switching voltage across a respective switch and an approximately triangular current in the output line whose frequency corresponds to the switching frequency.

The switching times for the power semiconductors have to be set such that a desired current results in the output line, wherein the average value of the current is generally desired as a controlled variable. A fixed switching frequency f=1/T and a fixed dead time $t_{db}$, that is to say the time between the switching off of one power semiconductor and the switching on of the other power semiconductor, are usually selected. The dead time $t_{db}$ is in this case selected only to be as long as necessary in order to be able to reliably rule out any short circuit of the half-bridge. The switch-on times of both switches are then usually determined, via a duty cycle d, as $t_{ON\_S1}=d*T-t_{db}$ and $t_{ON\_S2}=(1-d)*T-t_{db}$. The controller sets the duty cycle so as to give the desired average value for the current in the line.

In the case of real power semiconductors, switching losses arise, these reducing the efficiency of the system and leading to heating of the power semiconductors. Switching losses are usually accepted and dissipated by in some cases expensive cooling systems. Each switching procedure additionally generates a rapid change in the switching voltage, which causes undesired coupling-in via stray capacitances and thus interference in other switching parts and the surroundings. Very high switching frequencies, as may be achieved in more modern wide-bandgap semiconductors (GaN or SiC), are advantageous for the structural size and weight of inductors and capacitors, which often have to be used as filters and energy stores, but lead to increased requirements in terms of control, switching losses and EMC.

SUMMARY

The teachings of the present disclosure include improved half-bridges that reduce the disadvantages mentioned at the outset and methods for operating the half-bridge. For example, some embodiments include a half-bridge (102) comprising: a first and second power semiconductor (108, 110, S1, S2, S3, S4) that are connected in series, a controller (120) for the power semiconductors (108, 110, S1, S2, S3, S4), a line that starts from the connection node (112) of the power semiconductors (108, 110, S1, S2, S3, S4), a device (130) for measuring the current in the line, wherein the controller (120) is designed to compare the current with an upper and a lower threshold value (132, 134), to switch off the first power semiconductor (108, 110, S1, S2, S3, S4) when the upper threshold value (132) is reached and to switch on the second power semiconductor (108, 110, S1, S2, S3, S4) after a first dead time (210) has elapsed, and to switch off the second power semiconductor (108, 110, S1, S2, S3, S4) when the lower threshold value (134) is reached and to switch on the first power semiconductor (108, 110, S1, S2, S3, S4) after a second dead time (212) has elapsed.

In some embodiments, there are a first and second comparator (124, 126) to which the measured current is fed as first input signal, wherein the upper threshold value (132) is fed to the first comparator (124) as second input signal and the lower threshold value (134) is fed to the second comparator (126) as second input signal.

In some embodiments, the controller (120) comprises a digital controller (122) that forwards the upper and lower threshold value (132, 134) to the comparators (124, 126) via a digital-to-analog converter.

In some embodiments, there are the controller (120) calculates the threshold values (132, 134) from predefinable values for the average value of the current and for the ripple current in the output line.

In some embodiments, the controller (120) is designed to use the value 0 A for one of the threshold values or to use values that identify different current directions as threshold values (132, 134).

In some embodiments, the controller (120) is designed to calculate that threshold value (132, 134) that identifies a current direction different from the current direction of the average value for the current from the summed output capacitance of the power semiconductors (108, 110, S1, S2, S3, S4), the inductance (116) in the line and the voltage at the input and output of the half-bridge (102).

In some embodiments, the controller (120) is designed to set the dead times (210, 212) such that voltage-free switching on of the power semiconductors (108, 110, S1, S2, S3, S4) takes place.

In some embodiments, the controller (120) is designed to calculate the dead times (210, 212) or to select them from a stored table of values.

In some embodiments, the controller (120) has means (402, 404) for measuring the voltage across the first and second power semiconductors (108, 110, S1, S2, S3, S4).

As another example, some embodiments include a method for controlling a half-bridge (102) having a first and second power semiconductor (108, 110, S1, S2, S3, S4) that are connected in series, in which the current in a line starting from the connection node (112) of the power semiconductors (108, 110, S1, S2, S3, S4) is measured and compared with an upper and a lower threshold value (132, 134), the first power semiconductor (108, 110, S1, S2, S3, S4) is switched off when the upper threshold value (132) is reached and the second power semiconductor (108, 110, S1, S2, S3, S4) is switched on after a first dead time (210) has elapsed, and the second power semiconductor (108, 110, S1, S2, S3, S4) is switched off when the lower threshold value (134) is reached and the first power semiconductor (108, 110, S1, S2, S3, S4) is switched on after a second dead time (212) has elapsed.

BRIEF DESCRIPTION OF THE DRAWINGS

Further details of the half-bridge and of the method become apparent from the dependent claims, which are not discussed above. The teachings are further explained in more detail below on the basis of exemplary embodiments with reference to the drawing. In this case, in each case in schematic and simplified form:

DETAILED DESCRIPTION

Figure 1:
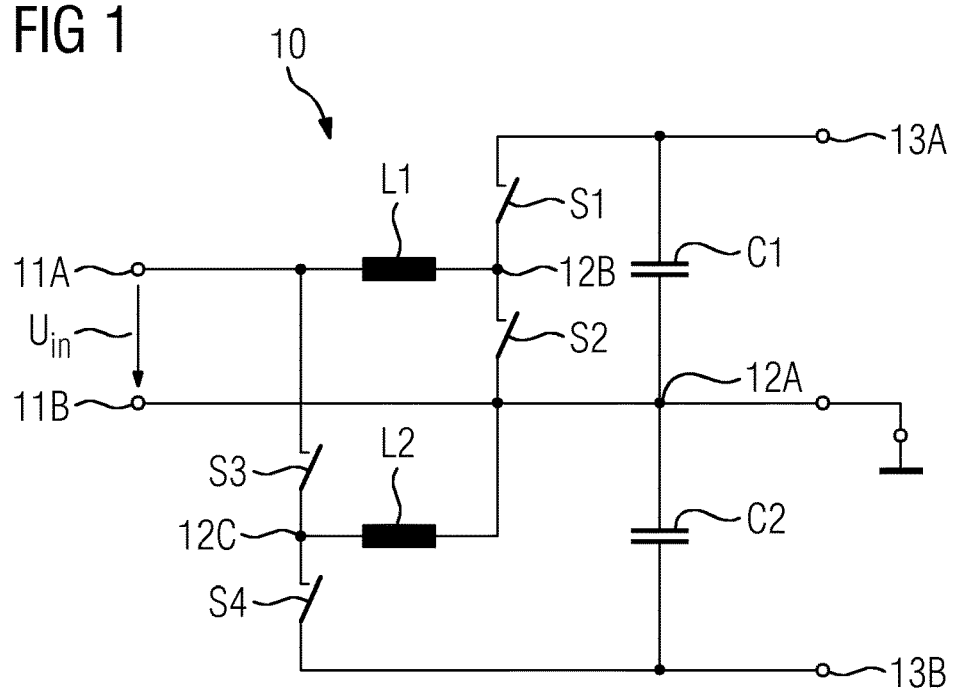
FIG. 1 shows an electrical converter incorporating teachings of the present disclosure.

The teachings of the present disclosure include a half-bridge comprising a first and second power semiconductor connected in series, a controller for the power semiconductors, a line that starts from the connection node of the power semiconductors and a device for measuring the current in the line. In this case, the controller is designed to compare the current with an upper and a lower threshold value and to switch off the first power semiconductor when the upper threshold value is reached and to switch on the second power semiconductor after a first dead time has elapsed. The controller is furthermore designed to switch off the second power semiconductor when the lower threshold value is reached and to switch on the first power semiconductor after a second dead time has elapsed.

In some embodiments, a method for controlling a half-bridge having a first and second power semiconductor that are connected in series, the current in a line starting from the connection node of the power semiconductors is measured and compared with an upper and a lower threshold value, the first power semiconductor is switched off when the upper threshold value is reached and the second power semiconductor is switched on after a first dead time has elapsed, and the second power semiconductor is switched off when the lower threshold value is reached and the first power semiconductor is switched on after a second dead time has elapsed.

Reaching the upper threshold value is in this disclosure understood to mean reaching or exceeding within the meaning of "greater than or equal to", or only exceeding within the meaning of "greater than". In the same way, reaching the lower threshold value is understood to mean reaching or falling below within the meaning of "less than or equal to", or only falling below within the meaning of "less than". The power flow of the half-bridge may run from the line to the outer terminals of the power semiconductors or vice versa. The current flow direction in the line may be directed away from the power semiconductors, which is considered here to be a positive current flow, or be directed toward the power semiconductors, which is considered to be a negative current flow. The device for measuring the current may be provided close to the half-bridge in the line. In some embodiments, the device may also be arranged in a return line from a load to one of the outer terminals of the power semiconductors, whereby the current in the line is measured in spite of the different placement. The inductive load or part of the inductive load may thus in particular be arranged between the location of the current measurement and of the half-bridge.

In some embodiments, a fixed switching frequency that defines the switching times of the power semiconductors is thus not selected, but rather the switching of the power semiconductors is performed on the basis of measured current values and threshold values for the current. If for example a change in the load of the half-bridge thus leads to the temporal current change becoming smaller, then the time until the current reaches one of the threshold values increases and switching times move further away from one another. This corresponds to a reduction in the switching frequency.

In some embodiments, the system allows a direct selection of the average value for the current and a direct selection of the ripple current. The desired average value of the current is implemented by the controller within just one period. In particular in the case of large switching frequencies, this may be considered to be P behavior, which simplifies the control greatly. In the case of digital controllers, this method furthermore makes it possible to keep the control frequency far below the switching frequency. In previous methods, this would lead to difficulties because there is usually more complex temporal behavior here. In some embodiments, the example method thus makes it possible for the first time also to control systems having very high switching frequencies (several 100 kHz up to the megahertz range) without great computational power, for example using simple and inexpensive microcontrollers. This method is additionally very robust in the case of changing input and output voltages and thus creates expansive possibilities in terms of the system design. In some embodiments, the ripple current is able to be selected independently of the operating point in the case of this half-bridge, which was not possible using previous methods.

In some embodiments, the half-bridge incorporating teachings of the present disclosure is that the current remains in the region of the threshold values and thus at the average current value that is predefined as setpoint value even in the event of changes of the current behavior, for example caused by load changes, since the switching behavior of the power semiconductors adapts to the current behavior by virtue of the threshold values and the current measurement. The same also applies to changes of the predefined values. If for example the setpoint value for the average current—and thus the threshold values—is raised, the current reaches the upper threshold value later or reaches the lower threshold value earlier than before, which shifts the switching times of the power semiconductors and raises the current average value to the new desired value.

Advantageous refinements of the devices according to the teachings become apparent and may be combined with the following features may also additionally be provided for the half-bridge and the method:

The controller may comprise a first and second comparator to which the measured current is fed as first input signal, wherein the upper threshold value is fed to the first comparator as second input signal and the lower threshold value is fed to the second comparator as second input signal. The controller may comprise a digital controller that forwards the upper and lower threshold value to the comparators via a digital-to-analog converter (DAC). The outputs of the comparators may be converted into control signals for the power semiconductors in a modulator. This results in a simple design, since microcontrollers are nowadays available in which digital-to-analog converters, comparators and the modulator are integrated. The method may therefore thus be implemented without additional hardware.

The controller may calculate the threshold values from predefinable values for the average value of the current and for the ripple current in the output line. By way of example, the threshold values may be calculated from the sum of and difference between the average value and the ripple current. It is then necessary to predefine only values relevant for the operation from outside the controller, while the controller generates the correct control values therefrom.

The controller may be designed to use a minimum value for the ripple current. In other words, the controller may force a situation whereby a minimum distance is maintained between the upper and lower threshold value, wherein this minimum distance corresponds to the minimum value for the ripple current. This achieves a situation whereby the switching frequency, resulting from the distance between the threshold values and rising as the ripple current falls, does not become too high.

The controller may use values that identify different current directions as upper and lower threshold value. The threshold value, lower by the magnitude, may be selected in each case such that it has a sign different from the desired average current. This particularly allows recharging of the output capacitors of the power semiconductors. This in turn makes it possible to switch on the power semiconductors at a low voltage, ideally in a voltage-free manner. In other words, the ripple current is in this case selected to be large enough that the threshold values adopt a different sign, that is to say identify a different current direction. Half the amplitude of the ripple current is then greater than the current average value. It may also be sufficient to use the value 0 A as one of the threshold values. Recharging of the output capacitors of the power semiconductors is thereby also made possible, and this thus allows voltage-free switching on.

The controller may calculate that threshold value that identifies a current direction different from the current direction of the average value for the current from the summed output capacitance of the power semiconductors, the inductance in the output line and the voltage at the input and output of the half-bridge.

The controller may set the dead times such that voltage-free switching on of the power semiconductors takes place. This achieves a considerable reduction in switching losses. A considerable improvement in the EMC properties is furthermore also achieved, since a resonant oscillation procedure takes place. The edges of the switching voltage thereby become significantly flatter and rounded. The spectrum of such a switching voltage exhibits considerably lower amplitudes in the harmonics.

The controller may additionally calculate the dead times or select them from a stored table of values. The calculation may take place for example from the summed output capacitance of the power semiconductors, the inductance in the output line and the voltage at the input and output of the half-bridge. As an alternative, the half-bridge may have means for measuring the voltage across the first and second power semiconductors. A switching operation may then take place on the basis of the measured voltage, which allows safe resonant switching.

The first and second dead time are expediently different from one another, since recharging the capacitors of the power semiconductors takes place with different absolute currents and thus takes different lengths of time.

In some embodiments, the switching losses are almost completely eliminated by adjusting the dead times. The efficiency of systems containing the half-bridge is thereby able to be increased greatly. Considerably higher switching frequencies than before are thereby able to be achieved with modern wide-bandgap semiconductors, that is to say for example switches based on GaN or SiC. The simultaneously improved EMC properties considerably reduce filter expenditure and thereby allow a more compact and more inexpensive design.

The half-bridge and the method relate to power electronics. The power able to be switched by the power semiconductors is at least 10 W, in particular at least 100 W or at least 1 kW. The switched voltage is at least 50 V, in particular at least 100 V or at least 300 V.

FIG. 1 shows a circuit diagram of an electrical converter 10 incorporating teachings of the present disclosure. The converter 10 corresponds in terms of its design to a connection between a step-up converter and a buck-boost converter, wherein the respective outputs are connected in series. The converter 10 has a first and second input terminal 11A, 11B for the input voltage, wherein the first input terminal 11A is to be used as a positive pole. The converter 10 furthermore has a first and second output terminal 13A, 13B, wherein the first output terminal 13A typically likewise represents the positive pole. The converter 10 furthermore has three electrical node points 12A, 12B, 12C, on the basis of which the design is described.

The first node point 12A is connected directly to the second input terminal 11B and also connected to ground. A first inductor L1 is arranged between the first input terminal 11A and the second node point 12B. A first semiconductor switch S1 is arranged between the first output terminal 13A and the second node point 12B. A second semiconductor switch S2 is arranged between the second node point 12B and the first node point 12A.

A first capacitor C1 is arranged between the first output terminal 13A and the first node point 12A, which first capacitor represents the output of the step-up converter that is formed from the first semiconductor switch S1, the second semiconductor switch S2 and the first inductor L1.

A third semiconductor switch S3 is arranged between the first input terminal 11A and the third node point 12C. A fourth semiconductor switch S4 is arranged between the second output terminal 13B and the third node point 12C. A second inductor L2 is arranged between the third node point 12C and the first node point 12A.

A second capacitor C2 is arranged between the second output terminal 13B and the first node point 12A, which second capacitor represents the output of the buck-boost converter that is formed from the fourth semiconductor switch S4, the third semiconductor switch S3 and the second inductor L2.

The semiconductor switches S1 . . . 4 in the converter 10 are GaN switches in this example. Other switches such as MOSFETs or IGBTs may however also be used.

During operation of the circuit, the step-up converter generates a positive voltage at the first capacitor C1. This positive voltage is in principle at least as great as the input voltage at the input terminals 11A, 11B. The buck-boost converter in turn generates a negative voltage at the second output terminal 13B in relation to the first node point 12A. As a result of the series connection of the two capacitors C1, C2, the output voltage between the two output terminals 13A, 13B in terms of magnitude is the sum of the magnitudes of the two generated voltages. The transformation ratio that results in the case of a given input and output voltage is thus halved in each case for the step-up converter and the buck-boost converter.

The converter 10 may additionally also be operated such that the target voltages at the capacitors C1, C2 are no longer DC voltages, but rather other waveforms, that is to say generally mixed voltages. To this end, a control device, not shown in the figures, is present and is designed to switch the first to fourth semiconductor switches S1 . . . S4 so as to give the desired voltage profile at the capacitors C1, C2.

Such a desired voltage profile may consist for example of a sequence of half-waves or of a DC voltage with an additional modulation. Since the generated voltages at the first and second capacitor C1, C2 also add together to give the output voltage, a high amplitude with a moderate transformation ratio may be achieved for the converter even in the case of a mixed voltage. For the sequence of half-waves, both the step-up converter and the buck-boost converter may for example generate a half-wave profile that is identical in terms of phase and amplitude. The amplitudes of the half-waves then add together in the output voltage at the output terminals 13A, 13B.

The converter 10 has two half-bridges that are each connected directly to an inductor: The half-bridge consisting of the first and second semiconductor switches S1, S2 is connected to the first inductor L1 and the half-bridge consisting of the third and fourth semiconductor switches S3, S4 is connected to the second inductor L2.

Figure 2:
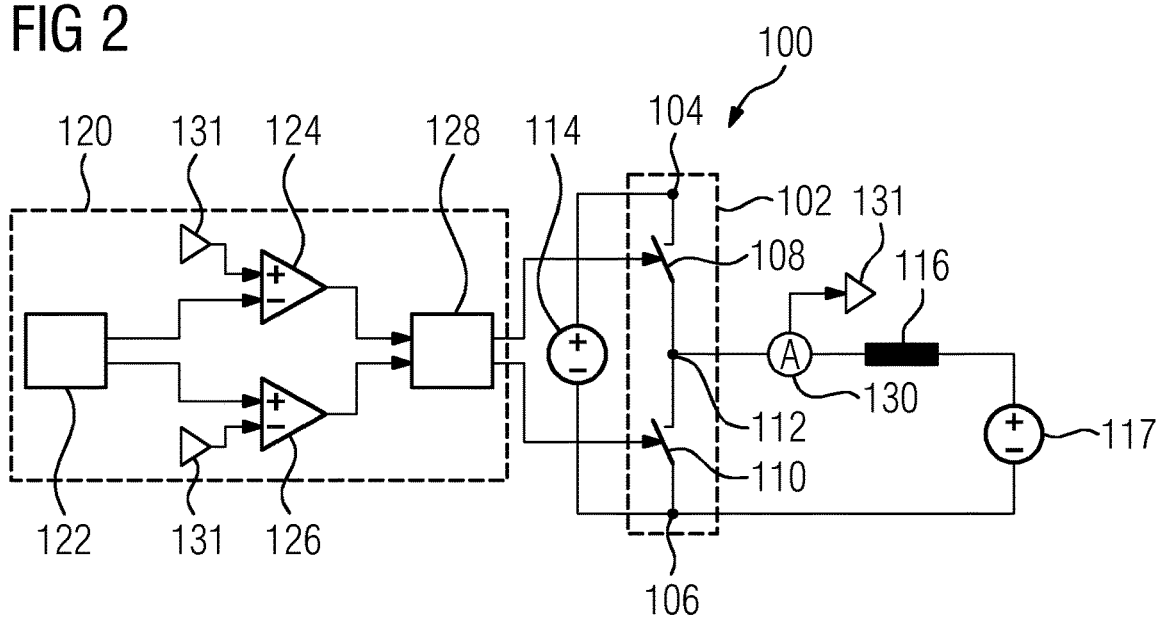
FIG. 2 shows an excerpt of a circuit containing a half-bridge with a first drive circuit incorporating teachings of the present disclosure.

FIG. 2 shows a greatly simplified excerpt of a circuit 100 having a half-bridge 102, which corresponds for example to the pair consisting of the first and second semiconductor switches S1, S2 and/or the pair consisting of the third and fourth semiconductor switches S3, S4 of FIG. 1. The half-bridge 102 may be part of the converter 10 or of any other power converter, such as for example an inverter, rectifier, power supply or another converter or be implemented on its own. The half-bridge 102 comprises two series-connected power semiconductors 108, 110, such as for example MOSFETs. The half-bridge 102 is often connected at the outer terminals 104, 106 to a DC voltage 114, for example to the intermediate circuit of an inverter. The central terminal 112 between the power semiconductors 108, 110 is connected to an inductive load 116. The inductive load 116 represents all kinds of loads, which may also be only partly inductive, and represents designs in which the inductive part of the load is formed for example by a power inductor. The inductive load 116 may thus very well also be a dedicated component or a parasitic element or both together.

The power semiconductors 108, 110 are driven by a control unit 120. The control unit 120 comprises a digital controller 122, a first and second comparator 124, 126 and a modulator 128. It is possible for these elements to be parts of an individual microcontroller and thus to be designed as an individual module. These elements may however also likewise be present in part or in full as separate components. The control unit 120 furthermore comprises a current measurement apparatus 130 that records the current arriving at or leaving the central terminal 112 as a signal 131.

The first comparator receives the signal 131 for the measured current and a first threshold value 132 for the maximum current as input signals. The second comparator likewise receives the signal 131 for the measured current and a second threshold value 134 for the minimum current as input signals. The threshold values 132, 134 are made available by the controller 122. The controller 122 may calculate these for example from predefined values for the average current and the current ripple. These predefined values may be predefined externally, for example by a superordinate inverter controller or be determined by the controller 122 itself. The output signals from the comparators 124, 126 are fed into the modulator 128. The modulator 128 converts these, as well as stored values for dead times to be applied, into drive signals for the power semiconductors 108, 110, which drive signals are forwarded to the respective gate driver.

By virtue of comparing the measured current with the threshold values 132, 134 for the maximum and minimum current and forwarding same to the modulator 128, a situation is achieved whereby the active power semiconductor 108, 110 is switched off when the maximum current is reached and the other power semiconductor 108, 110 is switched on after the dead time has elapsed in order to prevent any short circuit in the half-bridge 102. When the minimum current is reached, the active power semiconductor 108, 110 is likewise switched off and the other power semiconductor 108, 110 is switched on after the dead time has elapsed.

Figure 3:
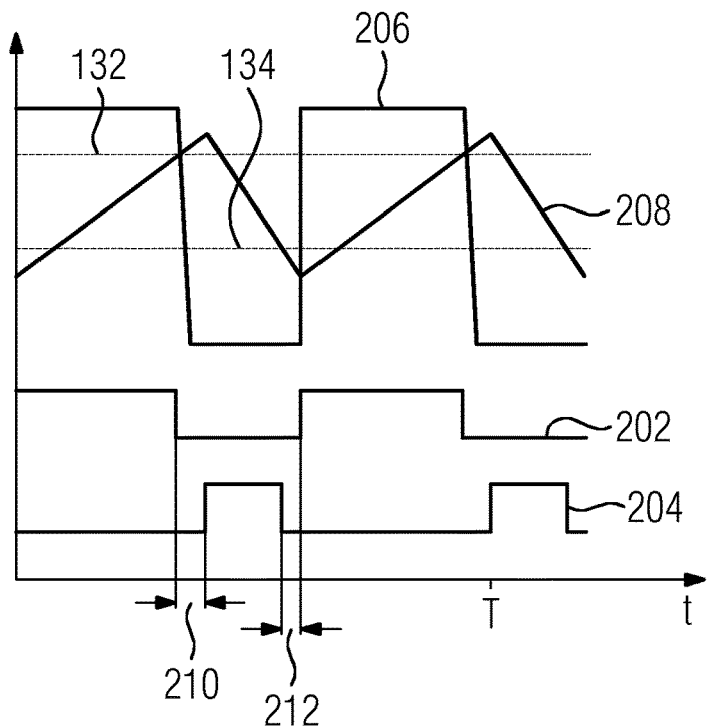
FIG. 3 shows a switching scheme and current profile incorporating teachings of the present disclosure.

A resultant switching scheme having a switching profile 202 for the upper power semiconductor 108, a switching profile 204 for the lower power semiconductor 110, a voltage profile 206 across the lower power semiconductor 110, together with a resultant simplified current profile 208, is illustrated in FIG. 3. The dead times 210, 212 that elapse following the switching off of a respective power semiconductor 108, 110 are in this case extended greatly for better clarity. FIG. 3 shows that the resultant current profile is approximately triangular.

If the current profile is flatter at any time, the corresponding threshold value 132, 134 is reached later and the switching off of the corresponding power semiconductor 108, 110 takes place only later. The described procedure for controlling the power semiconductors 108, 110 thus no longer operates with a fixed switching frequency, in contrast to known methods. The instantaneous effective switching frequency rather results by predefining the threshold values 132, 134 or predefining the average current and the ripple current, the inductance 116 and the voltages 114, 117, which jointly defines the current gradient. The instantaneous switching frequency may therefore also fluctuate and may change when the predefined values are changed.

Half-bridges according to the invention may particularly advantageously be used in the converter 10 of FIG. 1 when the generated voltage profile is a waveform, for example the sequence of sinusoidal half-waves. The half-bridges then do not generate them with a fixedly predefined switching frequency but a continuously adjusted duty cycle in the otherwise usual pulse width modulation. The current average value that matches the instantaneous value of the half-waveform is rather continuously adjusted. The controller 120 defines upper and lower threshold values suitable for the current average value, which thus likewise vary continuously. The correct voltage is then given by the switching of the power semiconductors 108, 110 that correspond to the pair consisting of the first and second semiconductor switches S1, S2 and/or the pair consisting of the third and fourth semiconductor switches S3, S4 in the converter 10 of FIG. 1, wherein the switching tracks the threshold values and thus automatically achieves the correct voltage.

Figure 4:
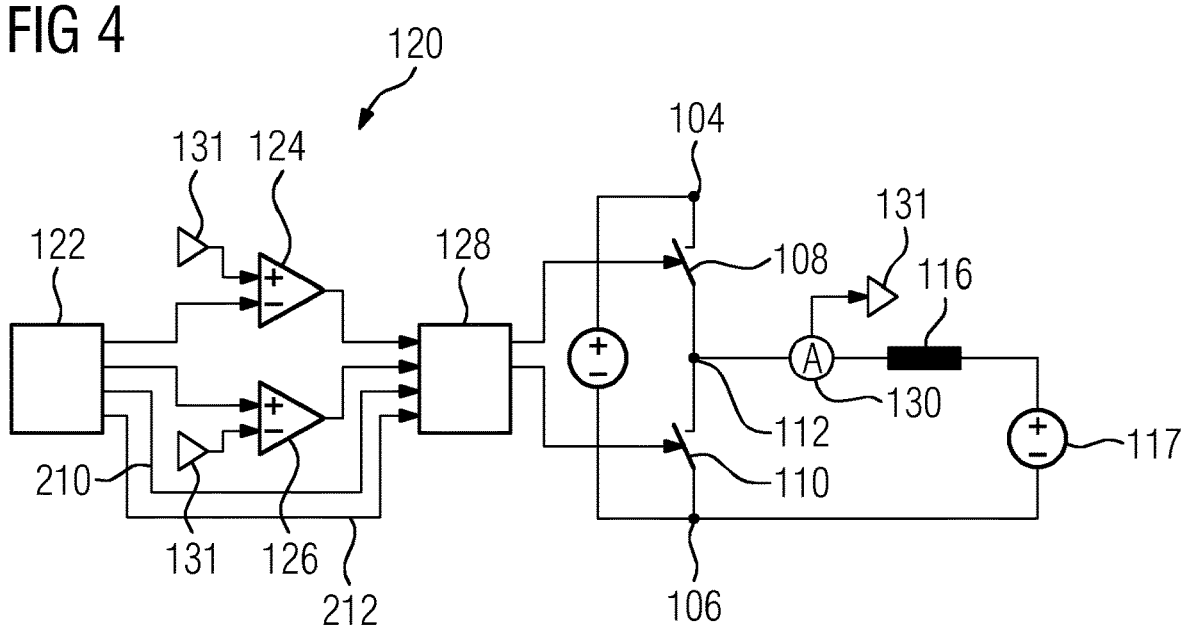
FIG. 4 shows the half-bridge with a second drive circuit incorporating teachings of the present disclosure.

FIG. 4 again shows an excerpt of a circuit 100 containing the half-bridge 102, but with a different design of the control unit 120. In this case, the dead times 210, 212 are no longer stored in fixed form in the modulator, but rather predefined by the controller 122. The dead times 210, 212 may thus be changed by the controller 122, and the operating situation may be adjusted. Such an adjustment may be used to reduce the switching losses by allowing resonant recharging of the output capacitors of the power semiconductors 108, 110.

To this end, in the case of a positive average value of the current, the threshold value 134 for the minimum current is set to a negative value, that is to say to a value having a sign different from the average value and the threshold value 132 for the maximum current. If the average value of the current is negative, the threshold value 132 for the maximum current is set to a positive value, that is to say again to a value having a sign different from the average value and the threshold value 134 for the minimum current.

The values required for recharging may be calculated as follows as a sufficient approximation:

$$I_L = \sqrt{\frac{C}{L} \cdot ((U_1 - U_2)^2 - U_2^2)}$$

In this case:

$I_L$ denotes the lower threshold value 134 for the current

L denotes the value of the inductance 116 in the output line $U_1$ denotes the voltage across both power semiconductors 108, 110, that is to say between the upper outer terminal 104 of the upper power semiconductor 108 and the lower outer terminal 106 of the lower power semiconductor 110

$U_2$ denotes the voltage 117

C denotes the summed output capacitance of the power semiconductors 108, 110, that is to say $$C = C_{OSS,S1} + C_{OSS,S2}$$

and $$I_H = \sqrt{\frac{C}{L} \cdot (U_2^2 - (U_1 - U_2)^2)}$$

In this case, $I_H$ denotes the upper threshold value 132 for the current

If the term under the square root sign has a value<0, the respective threshold value is set to 0.

The dead times 210, 212 may be determined by the controller 122 in various ways. Suitably determining the dead times 210, 212 makes it possible to switch on the power semiconductors 108, 110 in a voltage-free manner. The dead times 210, 212 may initially be calculated or be read from a previously determined and stored table (look-up).

In order to calculate the dead times 210, 212, the following formulae may for example be used:

$$t_{db1,min} = \sqrt{LC} \cdot \arccos\left(\frac{U_2}{U_2 - U_1}\right)$$

In this case:

$t_{db1,min}$ denotes the minimum dead time 210 for the upper power semiconductor 108

L denotes the value of the inductance 116 in the output line $U_1$ denotes the voltage across both power semiconductors 108, 110, that is to say between the upper outer terminal 104 of the upper power semiconductor 108 and the lower output terminal 106 of the lower power semiconductor 110

$U_2$ denotes the voltage 117

C denotes the summed output capacitance of the power semiconductors 108, 110

$$t_{db2,min} = \sqrt{LC} \cdot \left(\pi - \arccos\left(\frac{U_1 - U_2}{U_2}\right)\right)$$

In this case:

$t_{db1,min}$ denotes the minimum dead time 212 for the lower power semiconductor 110

Figure 5:
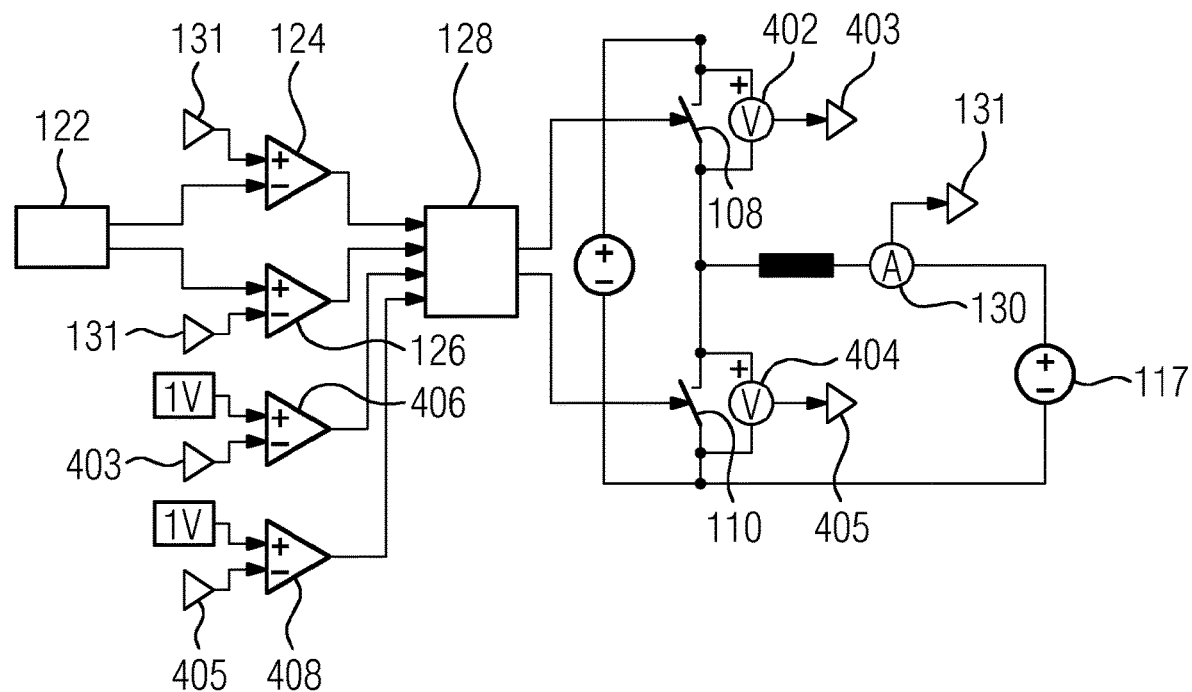
FIG. 5 shows the half-bridge with a third drive circuit incorporating teachings of the present disclosure.

A further option is that of making a structural adjustment that is illustrated in FIG. 5. In the design according to FIG. 5, the control unit 420 comprises a respective voltage measurement device 402, 404 for each of the power semiconductors 108, 110. The signals 403, 405 from the voltage measurement devices 402, 404 are fed to a third and fourth comparator 406, 408. A fixed low voltage, for example 1 V, is used as respective second input signal for the third and fourth comparator 406, 408. The output signals from the third and fourth comparator 406, 408 are fed to the modulator 128 and used thereby in order to use, as the switch-on time for the respective power semiconductors 108, 110, the time at which the voltage across the power semiconductors 108, 110 is low, that is to say for example 1 V.

Figure 6:
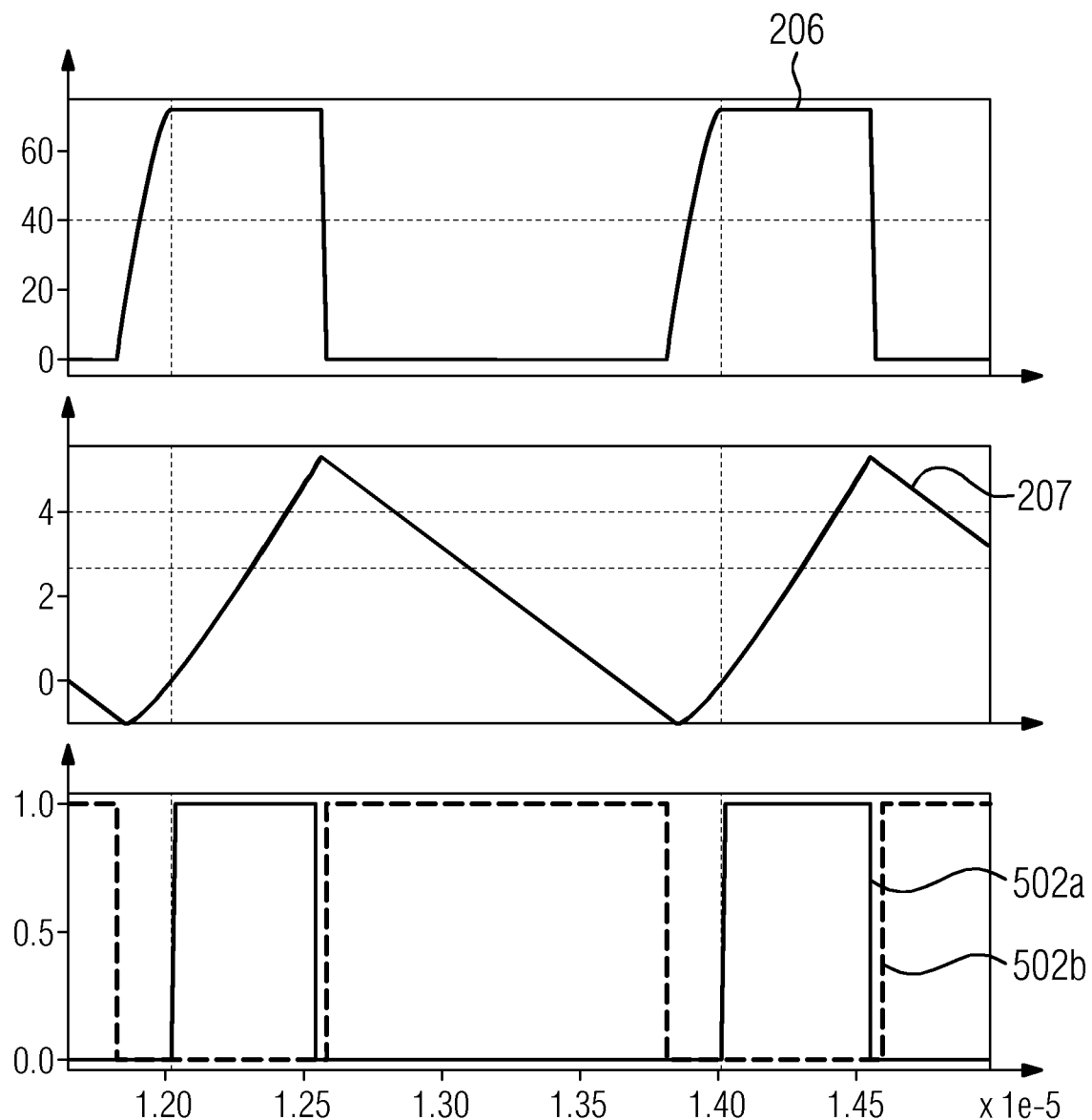
FIG. 6 shows a simulated switching behavior incorporating teachings of the present disclosure.

FIG. 6 shows the profile of the voltage 206, of the current 207 and of the switch-on times 502*a*, *b* for the first and second power semiconductors 108, 110 as a result of a simulation. The switching edges of the voltage 206 are able to be seen to be flattened. In this case, the output capacitances are recharged prior to the switching on of the respective power semiconductor 108, 110. The switching on therefore takes place in a voltage-free manner. The flatter edges of the switching voltage mean considerably lower amplitudes of the harmonics and thus also ensure better EMC properties of the design.

Since, in the case of very small current ripple values, the switching frequency may become very large, it is advantageous to achieve a minimum value for the current ripple. The controller 122 is designed to implement and to maintain this minimum value. The switching frequency is thereby limited to a desired maximum.

Figure 7:
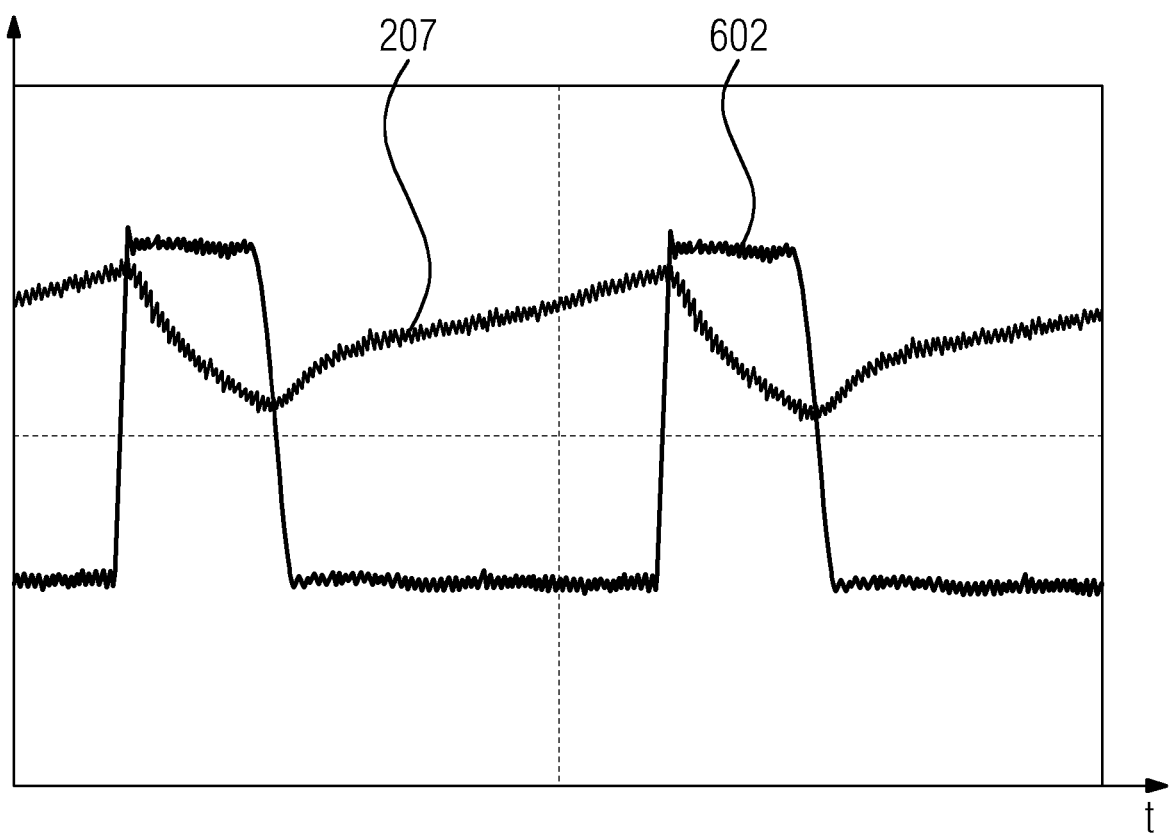
FIG. 7 shows a measurement result of a circuit incorporating teachings of the present disclosure.

A measurement result on a real design of the proposed circuit is illustrated in FIG. 7. FIG. 7 shows the switching voltage 602 and the current profile 207 of an on-board current measurement. The current profile 604 is not precisely linear due to the measurement. In the test design on which the measurement of FIG. 6 is based, an input voltage of 27 V was stepped up to roughly 100 V with an output power of approximately 90 W. Although the switching frequency is 1 MHz and the power semiconductors 108, 110 were only cooled by free convection (that is to say without heat sinks or fans), the operating temperatures remained in an uncritical region below 60° C. This would be impossible when switching off takes place at any time.

What is claimed is:

1. A half-bridge comprising:
   a first power semiconductor;
   a second power semiconductor connected in series with the first power conductor;
   a controller for the power semiconductors;
   a line starting at connection node of the power semiconductors; and
   a meter for measuring the current in the line;
   wherein the controller is configured to:
     compare the current with an upper threshold value and a lower threshold value;
     switch off the first power semiconductor if the upper threshold value is reached;
     switch on the second power semiconductor after a first dead time has elapsed; and
     switch off the second power semiconductor if the lower threshold value is reached; and
     switch on the first power semiconductor after a second dead time has elapsed;
   wherein one of the threshold values is 0 A or the threshold values identify different current directions for the upper and lower threshold values;
   wherein the controller calculates a threshold value identifying a current direction different from the current direction of the average value for the current from the summed output capacitance of the power semiconductors, an inductance in the line, and voltages at the input and output of the half-bridge.

2. The half-bridge as claimed in claim 1, further comprising:
   a first comparator; and
   a second comparator;
   wherein the measured current is fed to the first comparator and the second comparator as a first input signal;
   the upper threshold value is fed to the first comparator as a second input signal and the lower threshold value is fed to the second comparator as a second input signal.

3. The half-bridge as claimed in claim 2, wherein the controller comprises a digital controller forwarding the upper and lower threshold value to the comparators via a digital-to-analog converter.

4. The half-bridge as claimed in claim 1, wherein the controller calculates the threshold values from predefinable values for the average value of the current and for the ripple current in the output line.

5. The half-bridge as claimed in claim 1, wherein the controller sets the dead times such that voltage-free switching on of the power semiconductors takes place.

6. The half-bridge as claimed in claim 5, wherein the controller calculates the dead times or selects them from a stored table of values.

7. The half-bridge as claimed in claim 1, wherein the controller measures a voltage across the first and second power semiconductors.

8. A method for controlling a half-bridge having a first and second power semiconductor connected in series, the method comprising:
   measuring a current in a line starting from a connection node of the power semiconductors;
   comparing the current with an upper and a lower threshold value;
   switching off the first power semiconductor when the upper threshold value is reached followed by switching on the second power semiconductor after a first dead time has elapsed;
   switching off the second power semiconductor when the lower threshold value is reached followed by switching on the first power semiconductor after a second dead time has elapsed;
   wherein one of the threshold values is 0 A or the threshold values identify different current directions for the upper and lower threshold values; and
   calculating a threshold value identifying a current direction different from the current direction of the average value for the current from the summed output capacitance of the power semiconductors, an inductance in the line, and voltages at the input and output of the half-bridge.

* * * * *